United States Patent
Kalfaian

[15] 3,659,051
[45] Apr. 25, 1972

[54] COMPLEX WAVE ANALYZING SYSTEM

[72] Inventor: Meguer V. Kalfaian, 962 Hyperion Avenue, Los Angeles, Calif. 90029

[22] Filed: Jan. 29, 1971

[21] Appl. No.: 111,095

Related U.S. Application Data

[63] Continuation of Ser. No. 821,550, Apr. 29, 1969, abandoned.

[52] U.S. Cl. ..................................................179/1 SA
[51] Int. Cl. ..................................................G10l 1/00
[58] Field of Search.....................179/1 SA, 15.55 R; 324/77

Primary Examiner—Kathleen H. Claffy
Assistant Examiner—Jon Bradford Leaheey

[57] ABSTRACT

In a complex sound wave wherein the information bearing group of resonances vary within different frequency regions in the sound spectrum, the detected signals derived from said group of resonances are regrouped in prearranged numerical combinations sequentially until a reference regrouping is established for neutralizing said variations.

1 Claims, 5 Drawing Figures

COMPLEX WAVE ANALYZING SYSTEM

This is a continuation of Ser. No. 821,550, filed Apr. 29, 1969, now abandoned.

This invention relates to a system of sound wave analysis, such as speech or sonar target waves, and more particularly to a system for neutralizing any undesired effects of frequency vatiations that may occur in the sound waves, by regrouping the detected signals from the varying frequency components of the sound wave to a standard arrangement, so as to provide analytical accuracy in the process of deriving a desired information from the sound by comparative matchings of the regrouped signals with that of standard groups of signals.

In its broader aspects, the signal regrouping is established at the outputs of a bank of channels arranged in predetermined numerical order, each one of which is provided with a plurality of signal-admitting inputs, and a plurality of signal-switching inputs, respectively. The detected signals derived from varying resonances (sub-band divisions) of the sound wave are applied to the plurality of signal-admitting inputs, so that any one of the applied signals can be admitted to the output of any one of the channels by the operation of a respective signal-switching input. A plurality of prearranged combinations of groups of switching signals are applied sequentially to the plurality of signal-switching inputs for regrouping the detected signals admitted to the outputs of the bank of channels until a specific group of the detected signals are regrouped in a standard numerical region of the numerically assigned channel outputs. A group of signals from the regrouped signals at the channel outputs are then selected and their amplitude ratios one with respect to another are matched with plurality of prearranged groups of amplitude-ratio measuring means, for deriving from one of last said means a final signal representative of the sound information.

With the brief explanation given above, the object of the present invention is accordingly to provide a switching matrix suitable for regrouping any combination of signals to any utilization arrangement that may be useful in practice. Thus, while the switching arrangement disclosed herein will be described in a limited mode of operation, it is also capable of being used in a scope that embraces various other forms in practice.

IN THE DRAWINGS

Figure 5:
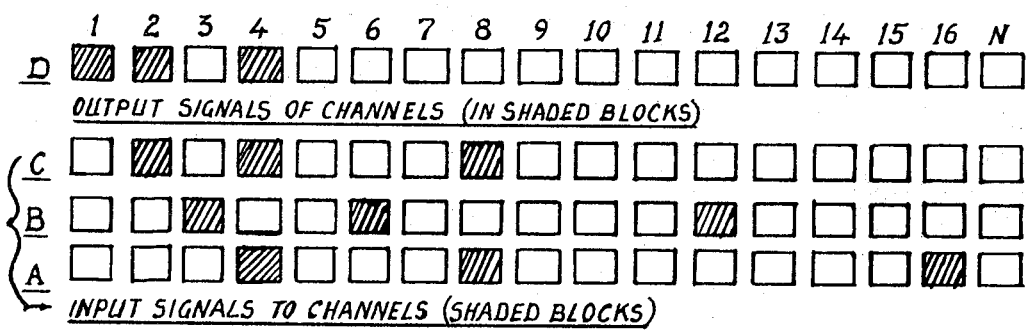

And FIG. 5 is a graphical illustration involved in explaining how the detected signals are regrouped at the channels outputs.

GRAPHICAL REPRESENTATION OF SIGNAL REGROUPING AT THE CHANNEL OUTPUTS

In reference to variations of resonances in the sound spectrum, for example, in speech sound waves, a group of resonances representing a specific phonetic sound may vary in different frequency regions of the sound spectrum due to characteristic differences between different speakers. For purposes of deriving the phonetic information from said group of resonances, it may be necessary to analyze the mutual frequency ratio relationships between the individual resonances of the group, rather than determining their specific distributions in the sound spectrum. Such a practice, however, would require a highly complicated follow-up system to determine the frequency ratios during varying states of the group of resonances. As an alternative, it is possible to first regroup these resonances in a reference region of the sound spectrum, so that their frequency ratios one with respect to another can be matched with standard ratios for high accuracy of analysis. As a further reduction to simplicity of practice, we may regroup the detected signals derived from the group of varying resonances at the outputs of these channels in an order that, the detected signal derived from the lowest frequency in the group is always shifted to the output of the first channel (as a reference numerical), and the other signals are shifted to the outputs of channels by the same factors of multiplication from the first channel as the other frequencies differ from the lowest frequency in the original group.

In order to explain this regrouping graphically, we may further represent these detected signals in terms of numerals on a numerical scale, as in FIG. 5, which shows three groups of numerals (as a simple example) distributed in three different numeral regions on a numerical scale, as shown in shaded blocks at A, B and C. Inspection of the numerical distribution of these three groups of numerals indicates that they all have the same mutually related ratio separations along the numerical scale. Accordingly, if we were to divide and regroup these three groups of numerals to a standard numeral region, starting from the reference numeral in the first shaded block at D, all three of the groups will be represented by the fixed group, as shown at D. As a reversing operation, by using the same factors of multiplication (as used originally for division), the group of numerals at D may be converted into the original distributions at A, B and C, or into any group that may be desired. For greater detail, however, reference may be made to the charts in the related case U.S. Pat. No. 3,622,706, issued Nov. 23, 1971. By this exemplary and simulated illustration, actual operation of the signal regrouping may be accomplished by the arrangement, as in the following:

SWITCHING MATRIX OF FIG. 1

Figure 1:
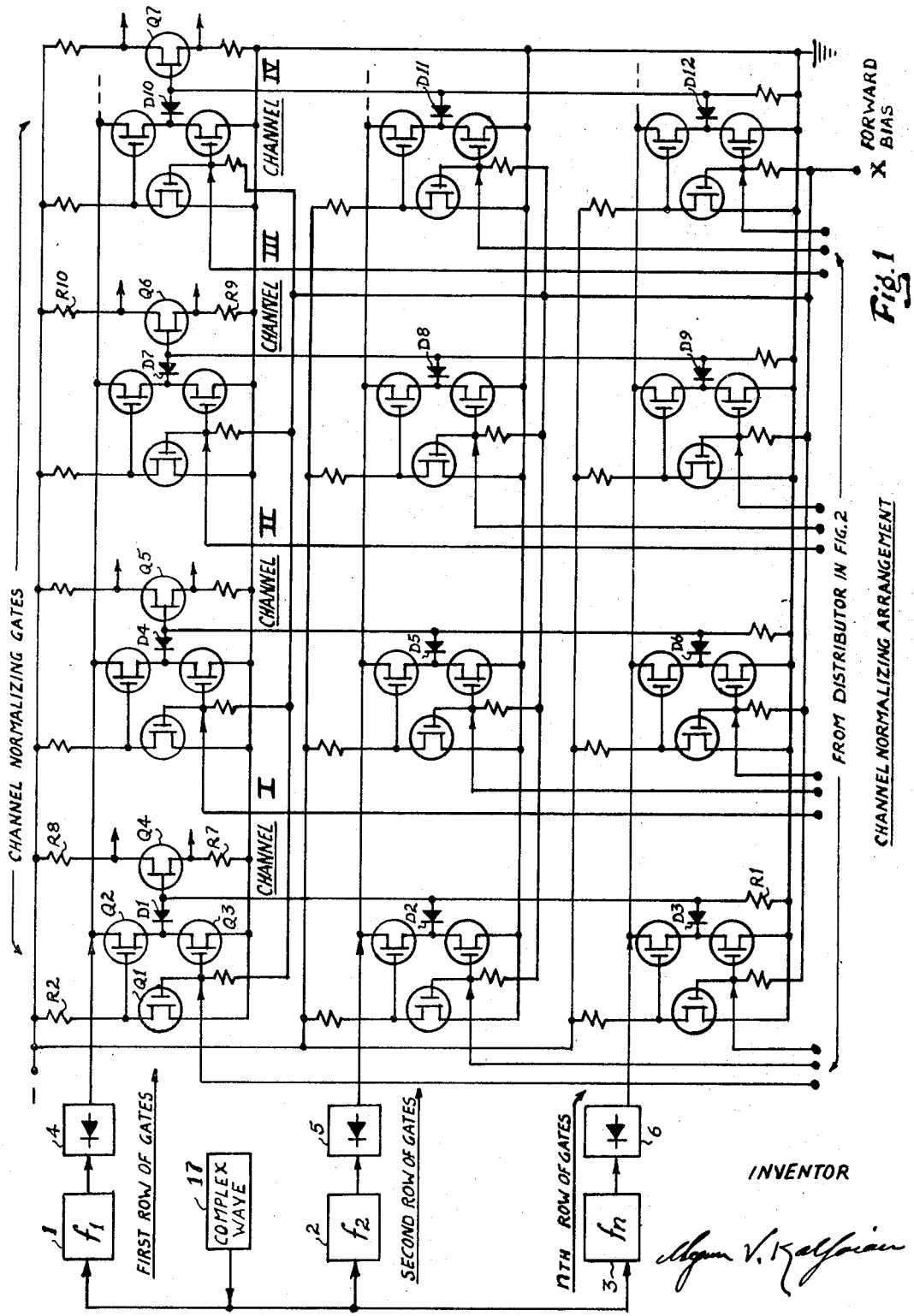
FIG. 1 is a switching matrix for connecting signals derived from various frequency components of the sound wave to different channels in a plurality of different combinations, for the required regrouping of the sub-band signals at the channel outputs.

In reference to the signal-regrouping arrangement, as shown in FIG. 1, there are used a plurality of rows of on-and-off analog switches, the inputs of which may be controlled independently for combining the outputs of any group of switches in a row with the outputs of groups of switches in other rows. The inputs of these switches in each row are connected in parallel, and fed by the output detected signal of one of a plurality of pass-band filters which are used for dividing the original complex sound wave into a plurality of sub-bands. Because of the plurality of parallel connections of the switch inputs, it is preferable that these switches are chosen with high input impedances. Accordingly, and due to the presently preferred usage of available integrated circuits, these gates are shown in the arrangement of FIG. 1, having field-effect (MOS FET) transistors, such as the series-shunt switch consisting of transistors Q1, Q2, and Q3. The switching transistors Q2 and Q3 are connected in series with the detected signal voltage, and the output is taken from the junction point of the series connection between the transistors Q2 and Q3. In a series-shunt arrangement, when Q2 is made conductive for admitting the input signal voltage to the load circuit resistor R1, in series with the mixer diode D1, the Q3 is made non-conductive. Whereas, when the input signal voltage is to be isolated from the load circuit resistor R1, the transistor Q2 is made non-conductive and the Q3 is made conductive, as a shunt circuit, so as to prevent any leakage passing to the load circuit. Since the signal voltage is normally to be isolated from the channels, the transistor Q2 is therefore rendered normally non-conductive, and the transistor Q3 is normally made conductive. These alternately on-and-off operative states of the transistors Q2 and Q3 are achieved by the control transistor Q1, which is normally rendered conductive by a negative forward bias (from terminals $X$) upon its gate electrode. The gate electrode of Q3 is connected in parallel with the gate electrode of Q1, and therefore, Q3 is also made conductive for normally shunting a load resistor, if required to be used from the junction terminal between Q2 and Q3, to ground. The drain electrode of Q1 is connected in parallel with the gate electrode of Q2, so that the normal current flow through resistor R2 drops the voltage upon the gate electrode of Q2 close to ground potential, and since a MOS transistor does not conduct before its gate electrode is biased at several volts in forward direction, the transistor Q2 remains normally in non-conductive state. When a positive pulse is applied to the gate electrode of Q1, however, the transistors Q1 and Q3 become non-conductive, and Q2 becomes conductive, so that the signal voltage at the drain terminal of the transistor Q2 is transmitted to the gate electrode of the channel-representing transistor Q4, in series with the diode D1. Of course, different types of integrated switching circuits are available, and other types than shown in the arrangement of FIG. 1 may be used suitably. Similarly, since all of the analog switches shown in the arrangement are of a similar type, for practical purposes, repeat description of the operation of the other switches shown is omitted herein. For reference of component parts, however, the transistors Q1 and Q3 of all the switches, including the diodes D1 through D12 may be eliminated, and the gate electrodes of the Q2 transistors excited by more simpler means. For further simplicity, multiple channel switching integrated circuits may be cascaded, for example, by the commercially available device designated, as MEM2009.

In reference to the general arrangement in FIG. 1, the original complex sound wave in block 17 is first divided into sub-bands by the pass-band filters in blocks 1, 2, and 3 (and to the nth sub-band not shown for simplicity of drawing), and their outputs are detected in blocks 4, 5, and 6, respectively. The detected signal voltage from the output of block 4 is connected in parallel to the inputs of the first row of switches, as shown in the drawing. The detected signal voltage at the output of block 5 is connected in parallel to the inputs of the second row of switches, as shown in the drawing. And the detected signal voltage at the output of block 6 is connected in parallel to the inputs of the third row of switches, as shown in the drawing. The first row of switches, as shown in the drawing, are also shown coupled to the gate electrodes of transistors Q4, Q5, Q6, and Q7, which are represented as the various channels. The input of each one of these channels, for example, channel I, as represented by the transistor Q4, is connected to all of the detected signals from the detector blocks 4, 5, and 6, by the mixer diodes D1, D2, and D3 ( in the first, second, and third rows), so that only one of the outputs of the pass-band filters may be coupled (after being detected) to the input of transistor Q4. Similarly, the detected outputs of these filters are mixed by the diodes D4 to D6, and connected to the input of the transistor Q5, representing the number II channel. These mixed connections are consistent throughout the channels, such as shown by the mixed connections of the filter outputs (after detection) to the input of Q6 (representing the number III channel) by the diodes D7 to D9, and the same mixed connections to the input of the channel IV, by the diodes D10 to D12, as shown. Thus it is seen that any one, or a group, of the output signals of the pass-band filters may be connected to the input, or inputs, of the said channels, as desired. These connections are then electrically established by applying control signals to any one of a plurality of gates, in any combination that may be desired.

SWITCHING DISTRIBUTOR TO DIFFERENT COMBINATIONS OF THE MATRIX IN FIG. 2

In speech sound waves the information may be contained within a time interval between two major peaks of the complex wave. When the sound wave is divided into sub-bands, the detected signals derived therefrom are stored in proportional amplitudes, so that they may be analyzed after said storages have been completed. These storages represent the peaks of the various sub-bands that are present during a portion of the time period between two major peaks. Thus, the signals stored during a time interval between two major peaks may be analyzed during an early portion of the time period that will be occupied between the succeeding two major peaks. After said analysis has been completed, the said storages may be established during the remainder of the time period between the last said succeeding two major peaks. If preferred, however, two sets of storage means, for example, two sets of capacitors may be employed, so that when the first set is charged during a charging time interval, the charge of the other set is analyzed by the action of a simple alternate switch, for example, by the alternate charging and discharging systems that I have disclosed in my previous patent disclosures, for example, in my U.S. Pat. No. 3,265,984 Aug. 9, 1966, wherein, two capacitors are charged and discharged alternately for the purpose of amplitude equalization of the sound waves at major peaks. For simplicity of operation, however, the use of a single set of storage capacitors may be preferable, because in information carrying sound waves the time intervals between major peaks are sufficiently long to allow a plurality of complex analysis within an early portion of any one of said time intervals. For example, if a time period of 2,000 microseconds is allowed after selection of each major peak of the sound wave for the formation of twentyeight different signal regrouping combinations, the time allowed for each step of the said combinations will be 18 microseconds, which is long enough for the switches in FIG. 1 to operate efficiently for any form of analysis. Thus the arrangement in FIG. 2 will provide the required form of signal regrouping, although the choice is optional.

Figure 2:
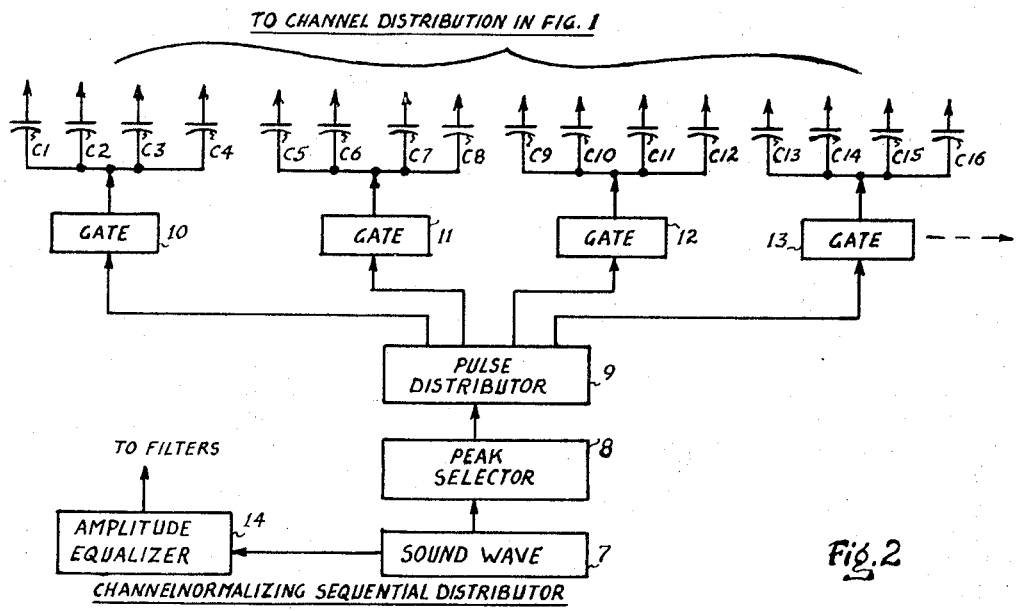
FIG. 2 is a distributing system for sequentially distributing different combinations of switching-signals to the switching inputs of the matrix for the said signal regrouping, until one of the combinations establishes the required signal regrouping at the channel outputs.

In the arrangement of FIG. 2, the sound wave in block 7 is applied to the major peak selector in block 8 for deriving therefrom pulses at said peaks. These pulses are applied to the normally idle distributor in block 9, which starts operating and distributes pulses to a predetermined number of combinations of gate electrodes of the switching arrangement in FIG. 1, through the coupling capacitors C1 through C16. There are shown four capacitors for each combination of couplings, in an exemplary form, but they may be prearranged in any lower or number of combinations, as required for any purpose that the system may be suited for. The complex sound wave in block 7 is applied to the pass-band filters in FIG. 1, in any conventional mode, as desired. Also, the amplitude variations of the original complex wave may be first amplitude equalized in block 14, if so desired, which is preferable in most cases. Thus, it is seen that the detected outputs of the pass-band filters in blocks 1 to 3 (and through the nth filter not shown) may be coupled to any combination of the channels, by the groups of capacitors C1 through C16 in a prearranged coupling matrix, under control of the distributor in block 9. Here again, reference is to be made to the numerical charts and circuit arrangements disclosed in my related patent application, as mentioned in the foregoing. The final analysis of these plurality of combinations of signal regroupings may be accomplished by a signal decoding comparison means, an arrangement of which is shown in FIG. 3.

SIGNAL DECODING MEANS IN FIG. 3

When a group of output signals from the pass-band filters are regrouped at the channel outputs, these signals are further translated into a discrete signal representative of the information to be identified. While different arrangements may be devised for the translation into such discrete signals, reference may be made to the circuit arrangements as disclosed in my previous patents, for example, in my U.S. Pat. issue No. 3,067,288 Dec. 4, 1962. Another arrangement, however, is shown herein in FIG. 3.

Figure 3:
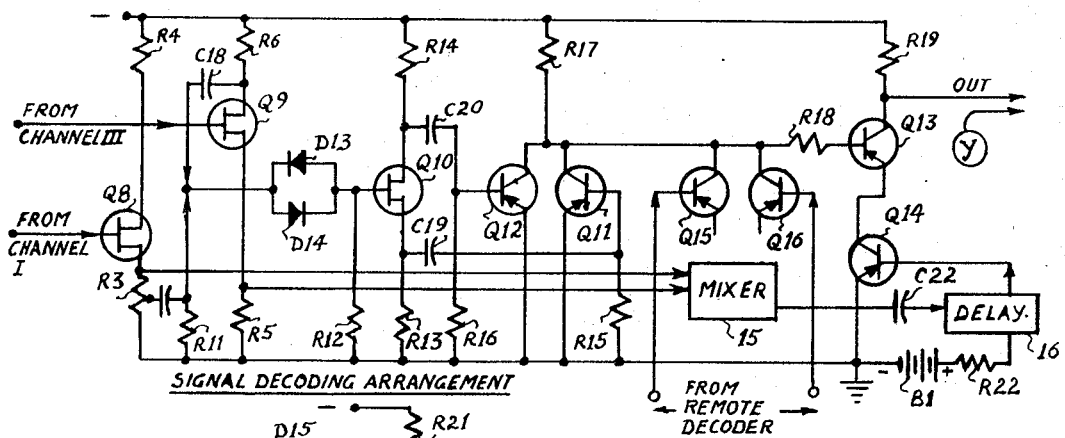
FIG. 3 is an exemplary arrangement of the plurality of signal-amplitude-ratio comparison arrangements.

In FIG. 3, assume that two output signals of the pass-band filters are to be passed through the first and third channels, as represented by the transistors Q8 and Q9, which are used as source followers to eliminate as much variables as possible for stable operation. The source and drain circuit resistors of these transistors are designated as R3 through R6, respectively. For clarity of description, the transistors Q8 and Q9, and also the resistors R3 through R6 may be referenced with the channel transistors and resistors in FIG. 1, as Q4 and Q6, and R7 through R10, respectively. The outputs of the transistors Q8 and Q9 (first and third channels) are combined in opposing polarities in preadjusted amplitude ratios, so as to obtain a zero (or a threshold minimum) output signal when the said combination matches one of a sequentially introduced plurality of combinations that represents the information sought. This resultant zero output is then translated into some form of function representative of that particular information.

In order to avoid critical operating conditions, as encountered by environmental changes in component parts, the transistors Q8 and Q9 are operated as source followers, so that equal positive and negative outputs may be easily obtained under different operating conditions. Since the zero output of the combined signals should result from ratio measurements, rather than by discrete signal amplitude measurement, the source circuit resistor R3 of Q8 is pre-tapped for predetermined ratio of voltage change with respect to the voltage change across the drain circuit resistor (equal value) R6 of Q9, when the inputs of these two transistors are impressed by voltage signals of unequal amplitudes. Thus, if the difference both in phase and amplitudes of the simultaneously applied negative voltage pulses to the inputs of Q8 and Q9 happen to have this ratio in opposite directions, the negative and positive voltage changes across resistors R3 and R6, respectively, will be cancelled out across the load circuit resistor R11, as applied by the coupling capacitors C17 and C18. Whereas, when this ratio between the two input signals is different than specified, an output signal voltage will appear across the load resistor between the two signals. The zero output signal represents the information sought, and any other signal above zero, or a threshold level, represents a false information. Thus the zero signal may be translated into a functional signal, as in the following:

The voltage change across R11 is first transferred to the resistor R12 through the threshold gating diodes D13 and D14, which conduct only when the applied voltage is above a certain level. This threshold level may be adjusted to any level, however, by connecting zener diodes in series with D13 and D14; but such an arrangement is conventional, and therefore, it is not shown in the drawing. The voltage across R12 is applied to the gate electrode of the phase inverting transistor Q10, which provides both positive and negative output signals across source and drain circuit resistors R13 and R14, regardless of the input phase. These oppositely poled output signals are coupled to the base electrodes of transistors Q11 and Q12, through the coupling capacitors C19 and C20, across load resistors R15 and R16, respectively. The collector electrodes of transistors Q11 and Q12 are connected in parallel, with a common collector circuit resistor R17. Thus, regardless of the polarity of the input pulse signal at the gate electrode of Q10, one of the transistors Q11 or Q12 will conduct and pull the collector voltage close to ground level. The collector terminals of Q11 and Q12 are connected to the base electrode of series-connected gate transistor Q13 in series with the current limiting resistor R18, so that the Q13 is normally rendered conductive. The other series-connected gate transistor Q14, however, is normally biased by the battery B1, in series with load resistor R22, so that normal current does not flow through the collector circuit resistor R19 of the said gate. The base electrode of transistor Q14, however, is impressed by a negative pulse signal from the block 15, simultaneously with the arrival of a negative pulse signal at the base electrode of either Q11 or Q12, so that when the voltage across R17 is pulled close to ground level, the series-connected gate transistor Q13 becomes inoperative, and therefore, the conductive gate of the series-connected transistor Q14 cannot draw current through the collector circuit resistor R19 to produce an output signal. Whereas, when during conduction of the base electrodes of transistors Q11 and Q12 remain at zero voltage level, the transistor Q13 remains conductive and the voltage developed across resistor R19 is transmitted to an outgoing terminal for any functional purpose that may be desired. Thus it is seen that, only those pulse signals having specific amplitude ratios at the inputs of transistors Q8 and Q9 will cause an output signal across the resistor R19 to be utilized. When some variations occur in the selection of these informations, more than one of the arrangements shown in FIG. 3 may be used with varied adjustments across resistors R3 and R6, so that the resultant output of any one of these arrangements may be mixed to assure that the arriving information is selected by one of these arrangements. For drawing simplicity, however, the mixing is indicated by the terminal (Y), as arriving from a similar decoding arrangement of FIG. 3. The negative pulse signal at the input of Q14 is derived from the outputs of Q8 and Q9, which are mixed in block 15, and applied to the base of Q14 after the pulse being narrowed in width through a small coupling capacitor C22, and delayed slightly in block 16. This narrowing and delaying the pulse is to prevent operation of the gate, during simultaneous pulse applied to the base of Q13.

Referring again to the arrangement of FIG. 3, only two signals have been mentioned as arriving at the inputs of Q8 and Q9 for null balancing. In the case that a third (or more) signal must also be included for said balancing, as a group, and assuming that the third signal is to be measured with the signal arriving at the first channel (or arriving from any other channel, since the arrangement is versatile for any signal combination), the third signal is compared with the signal arriving at the first channel in a separate arrangement, such as shown in FIG. 3, and mixed at the collector terminal of Q11 and Q12. This is shown, for simplicity of drawing, only by the transistors Q15 and Q16, the collector electrodes of which are connected in parallel with the collector electrodes of Q11 and Q12, which serve for the purpose of functional operation. As mentioned in the foregoing, the transistors Q11 and Q12, and also the Q15 and Q16, must be normally non-conductive. The base electrodes of these transistors are shown at ground potential, since silicon transistors usually have very low emitter to collector leakage when their base electrodes are at emitter potential. However, there are available transistors with a variety of different operating characteristics, and the choice rests on the designer of these circuits. Similarly, an amplifier may be used at the input of transistor Q10, to make sure that the transistors Q11 and Q12 are driven highly conductive for properly cutting off the gate transistor Q13. Further, a clamping diode, or diodes, may be used at the last said amplifier to avoid overtaxing the amplifier. Still further, an integrated circuit differential amplifier may be used as substitute for the transistors Q8 and Q9. Similarly, unidirectional signals may be applied to the primary of a transformer for null output. And lastly, the load resistor R11 may be either shunted or substituted by on-and-off transistors, which may be in ON states during quiescent periods for discharging the coupling capacitors C17 and C18 to their normal voltage levels, and including means, if so desired, for rendering last said transistors in on-and-off states in synchronism with the distributing pulses from the distributor 9 in FIG. 2.

DETECTOR CIRCUIT ARRANGEMENT OF FIG. 4

Figure 4:
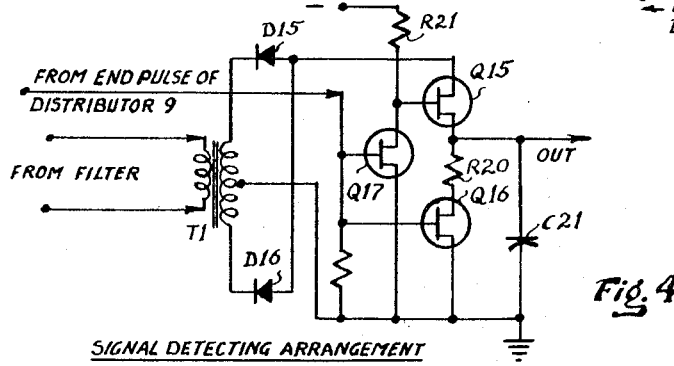
FIG. 4 is an exemplary arrangement of the plurality of signal detecting arrangements.

It has been described in the foregoing that the information carrying complex wave is analyzed immediately after selection of a major peak from the complex wave. This performance requires that all of the signal components at different frequencies of the complex sound wave are sampled and made ready for the grouped analysis just before the said peak is selected. It is therefore desirable that the detected signals are stored across low leakage storage devices for retaining the stored quantity of the signal, and dissipate it by force either completely or partly after each analytical performance, so that the succeeding signals may be stored in a successive sequence. It is contemplated herein that all of the detecting arrangements in blocks 4 to 6 in FIG. 1 are of replica type, and therefore, description of a typical arrangement, as shown in FIG. 4 will suffice. In FIG. 4, the sound wave across the secondary coil of the transformer T1 (which represents an output transformer from one of the sub-band pass filters in FIG. 1) is full-wave rectified by the diodes D15 and D16, and applied to the storage capacitor C21 in series with the analog switching transistor Q15, and in parallel with the normally open resistor R20. The analog switching transistor Q15 is normally biased to a conductive state by the negative supply voltage to its gate electrode in series with the resistor R21, so that the capacitor C21 is normally in a charging state. When the charge across C20 is to be dissipated during a short pulse period, however, the parallel connected transistor Q16 is made conductive from its normal non-conductive state, which causes discharge of the capacitor C21 in series with the resistor R20. During this discharge pulse period, the transformer T1 is prevented from being short circuited by rendering the transistor Q15 non-conductive, by conduction of the control transistor Q17. The discharging pulse may be taken from the output of the distributor in block 9 as indicated in FIG. 2, as a final pulse after said distribution pulses have been completed. The series connected resistor R20 is shown for preventing complete discharge of C21, but it may be dispensed with if so desired. Also, the combination of transistors shown in FIG. 4 represents one of the various types of presently available integrated circuits, and therefore, it may be readily utilized for the purpose herein.

While specific embodiments of the invention have been selected to describe the invention, it is obvious to the skilled in the art that they may be considered as exemplary, and that the invention is not limited in its utility. Accordingly, it is obvious that various modifications, adaptations, and substitutions of parts may be made without departing from the true spirit and scope of the invention.

What I claim, is:

1. A signal conversion system for a complex group of signals comprising a complex input signal, a plurality of bandpass filters and means for producing a control pulse, said input signal being applied to both said filters and said control pulse means, a plurality of and-gates, the complex signal output of each bandpass filter being applied as the first input to a corresponding one of said and-gates, said plurality of and-gates forming one channel of a plurality of channels, a pulse distributor providing a sequence of pulse outputs, the output of said control pulse means being connected to said pulse distributor, each pulse output from said distributor being applied to a second input of only a preselected one of said and-gates in each of said plurality of channels whereby only a single and-gate in each channel has an output at one instant and each sequential output pulse of said distributor operates a different and-gate in each channel, the output of each and-gate represents the respective channel output at one instant, a signal decoder, the outputs of each channel being compared by said signal decoder, the output of said decoder being produced when a predetermined relationship between said channel outputs is detected.

* * * * *